Jan. 9, 1940.    N. TRBOJEVICH    2,186,846
UNIVERSAL JOINT
Filed Jan. 17, 1938
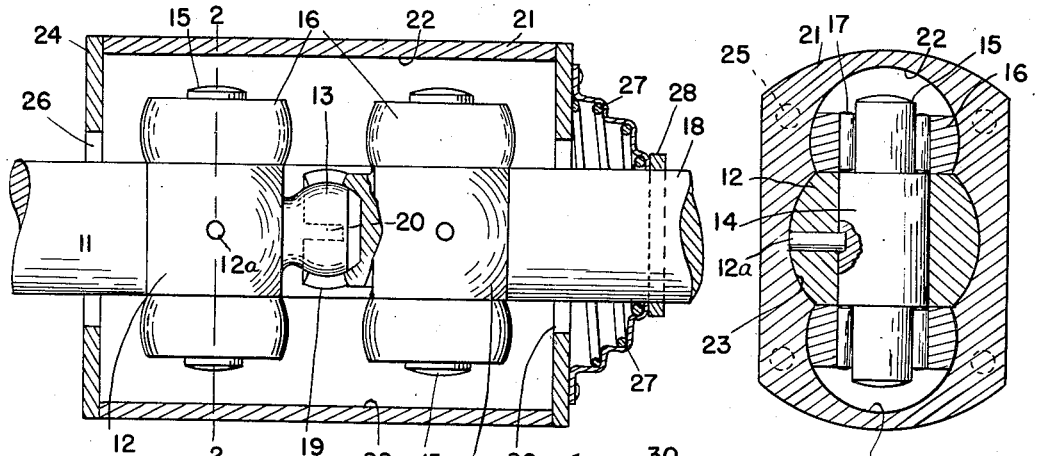
FIG.1.    FIG.2.
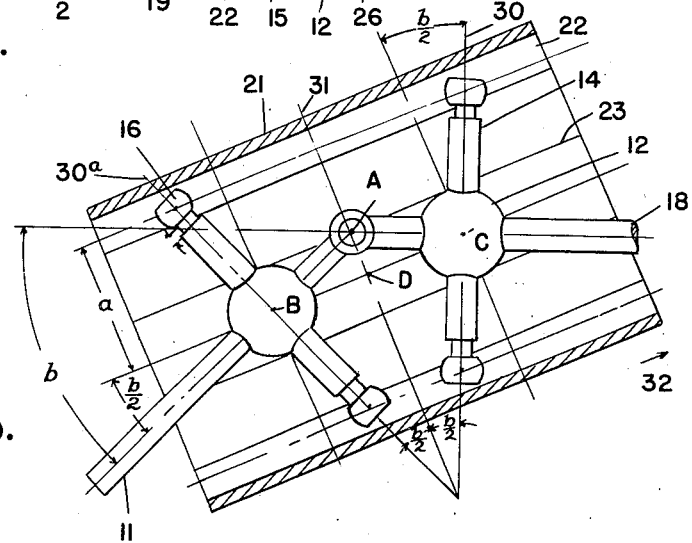
FIG.3.
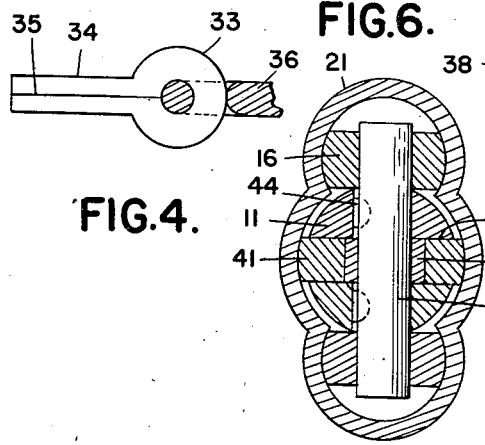
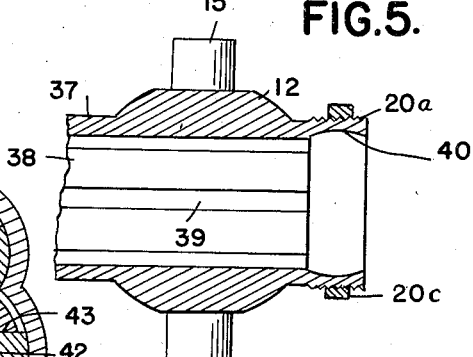
INVENTOR.
NIKOLA TRBOJEVICH
BY
*Whittemore, Hulbert & Belknap*
ATTORNEYS Patented Jan. 9, 1940

2,186,846

UNITED STATES PATENT OFFICE 2,186,846

UNIVERSAL JOINT

Nikola Trbojevich, Detroit, Mich.

Application January 17, 1938, Serial No. 185,462

5 Claims. (Cl. 64—21)

The invention relates to a universal joint of the antifriction and constant velocity type and is an improvement of my construction shown in my prior Patent No. 2,087,364 issued July 20, 1937.

The principle of operation in this case is the same as in the prior patent in which two T-shaped members are slidably mounted in a double barreled sleeve and interconnected by means of a ball joint. This arrangement constrains the sleeve to bisect the shaft angle at all times, thus producing a perfectly uniform velocity in both shafts.

I have now discovered a further improvement in the construction of the sleeve. In the prior patent I used a sliding key 21, Figure 2, in order to fix the sleeve relative to the above mentioned ball joint, but now I discard the sliding key altogether and permit the sleeve to freely float axially to a limited extent. As I shall hereinafter show and illustrate, this simplification does not affect the correct functioning of the mechanism at all but, on the contrary, it improves the same.

I have further now provided means whereby the sleeve is automatically centered relative to the shafts without placing an additional thrust upon the rollers. This phase of the invention is, however, optional and particularly applies to joints operating at higher or greater shaft angles.

One of the objects of this invention is to construct a joint of the indicated type having a sleeve which is lighter, stronger, and cheaper to manufacture and which is so constructed that it can be completely sealed at its two ends to retain the lubricant.

In the drawing:

Figure 1 is the principal cross section of the new joint shown with its shafts aligned and the left side oil seal removed;

Figure 2 is a section taken in the plane 2—2 of Figure 1;

Figure 3 is a geometrical diagram explaining the mathematical principle upon which this invention is based;

Figure 4 is a modified or alternate construction of the ball joint 13 and 19, Figure 1;

Figure 5 is a modified or alternate construction of either shaft 11 or 18, Figure 1, and also shows a further modification of the above mentioned ball joint.

Figure 6 is still another modification of either shaft 11 or 18, Figures 1 and 2, in which the spherical member 12 is replaced by means of a rotatable spherical roller 41 in order to reduce friction when the shaft reciprocates relative to the sleeve.

As seen from Figures 1 and 2, the shaft 11 is integral with the truncated ball 12 of a somewhat larger diameter than the shaft, and another truncated ball 13 of a lesser diameter. Extending through the center of the first ball 12 a cross shaft 14 is secured thereto by a pin 12a or other suitable means. The cross shaft terminates in two symmetrically disposed journals 15 at each end upon which two spherical truncated rollers 16 are rotatably and longitudinally slidably mounted by means of the intervening pin or needle rollers 17.

The second shaft 18 is similar to the one just described in all respects except that instead of the solid end ball 13 a hollow spherical stud 19 is used, closely fitting over the said ball 13 and concentric with the same. In order to facilitate the assembling, I cut a number of radial slots 20 in the said stud so that when the stud is forced over the ball it will spring out the required amount and snap back over the ball, thus holding the same. The ball joint may further be reinforced in position by cutting a screw thread 20a (see Figure 5) upon the outside of the stud and screwing on a suitable threaded ring 20c upon the same after assembling.

The sleeve 21 is a prismatic slab provided, first, with two parallel bores 22 each housing a pair of rollers 16, and second, with a central somewhat larger bore 23 housing the two truncated balls 12. In as much as only limited circumferential portions of these bores are needed for the successful operation of this joint, the three bores may be brought together to encroach upon each other as shown in Figure 2, which fact renders the design more compact. The sleeve 21 is made of a sufficient length to accommodate the four rollers in their extreme angular position, as shown in Figure 3, and is provided with two end plates 24, each having a circular or conical opening 26 and each being fastened to the corresponding ends of the sleeve by the use of four bolt holes 25. These end plates are attached to the sleeve after the shafts 11 and 18 have been assembled and placed into the said sleeve and will prevent the mechanism from falling apart in operation.

The lubricant is retained by two collapsible bellows-like sacs 27, one at each end of the sleeve, each anchored to the end plate 24 and ring 28. A coil spring 27a in the bellows may, or may not, be used at will and is therefore merely indicated in the drawing.

The theory of this joint was already explained in my previous cited patent and now I shall merely point out the effects caused by the two novel features of construction, meaning the floating sleeve 21 and the self-centering barrel or bore 23, Figure 3.

The axes of the shafts 11 and 18 intersect at the point A at a shaft angle $b$, shown in drawing to be about 45 degrees. The sleeve 21 is now automatically centered in that its axis must always pass through the centers B and C of the spheres 12.

I now drop the perpendicular AD upon BC. Since AB is equal to AC, the triangles DBA and DCA are identical and the angles DBA and DCA are equal to each other and to the one-half of the shaft angle $b$.

Because,

Angle $BAC = 180° - b$

Angle $BAD = CAD = 90° - \dfrac{b}{2}$ (one-half of the above)

Angle $DBA = DCA = \dfrac{b}{2}$  Q. E. D.

If I now rotate the shaft 18 with a uniform velocity, the centers of the rollers 16 will each describe a similar ellipse in the planes 30 and 30a, the major and minor half axes of the said ellipses being $$a \sec. \frac{b}{2} \text{ and } a$$

respectively where $a$ is the pitch radius of the sleeve as indicated in the drawing and $b$ is the shaft angle.

Thus, all four rollers 16 possess the same circumferential velocity at any one instant because, first, the two rollers situated at the ends of the same cross shaft 14 are always diametrically opposed to each other in the elliptical orbit, and second, the two orbits being interconnected by the barrels 22 are of necessity synchronous.

A point of interest is to note that in this system of conquering or liquidating the shaft angle in two steps or stages instead of only in one stage as in some other widely used constructions, the maximum tremor or vibration in the intermediate parts (in this case the sleeve 21) is reduced to one-fourth or less for the same shaft angle. I shall prove this very simply.

The maximum discrepancy in angular velocities of the shaft and sleeve occurs at the ends of the major axis of the ellipses 30 and 30a and is proportional to the distance $x$, the maximum longitudinal displacement of the roller 16 on its axis outwardly. But, $$x = a\left(\sec. \frac{b}{2} - 1\right)$$

where $a$ is the radius of the sleeve as formerly.

The gain in uniformity of the intermediate parts in the two-step construction is the ratio of the trigonometric function $$\left(\sec. \frac{b}{2} - 1\right)$$

with respect to (sec. $b-1$), the latter applying to a one-step construction. E. g. for $b = 45°$ sec. $22\frac{1}{2}° - 1 = .0824$
sec. $45° - 1 = .4142$ and the variation is only $\dfrac{.0824}{.4142} = 19.9\%$ of the one-step arrangement.

The practical consequence of this peculiarity is that the joint is inherently suitable for heavy torques, great shaft angles and high speeds.

It is also readily seen from the foregoing remarks that it is immaterial at which part of the sleeve the momentary midplane 31 is situated, i. e., an oscillation of the sleeve in the direction of the arrow 32 is permissible from the kinematical standpoint.

In Figure 4 an alternate construction of the ball joint interconnecting the axes 11 and 18 is shown. An anchor ring 33 having a stem 34 and slot 35 engages a similar anchor ring 36. This link mechanism should best have as little backlash as possible.

In Figure 5 the driving or the driven shaft 37 has a concentric bore 38 provided with splines 39. The spherical extension 40 on the right-hand side is an equivalent of the hollow stud 19, Figure 1. The purpose of the screw thread 20a was already explained.

Figure 6 represents a modification of Figure 2 and the principle disclosed therein is not only applicable to a joint of the type shown in my prior patent but also to the joints of the single carriage type, also known as the Spicer type, now widely used in automotive drives.

The novelty consists in replacing the spherical member 12, Figures 1 and 2, with a spherical truncated roller 41 and a bushing 42. The shaft 11 is now enlarged in diameter around the roller 41 and is provided with a rectangular slot 43 of a width corresponding to the width of the roller 41. The remaining parts in Figure 6 are numbered analogously to the parts previously described and the design will undoubtedly be understood without further comment. 44 are two key slots.

When the design shown in Figure 6 is used in the single carriage Spicer joint, it has remarkable advantages. The roller 41 now can roll in its barrel to and fro without causing any considerable friction which not only increases the efficiency of the mechanism but also prevents the danger of sticking, jamming, and breakage, i. e., it promotes safety.

What I claim as my invention is:

1. A universal joint comprising a pair of shafts, two rollers mounted on each shaft and rotatable and longitudinally slidable upon an axis at right angles to the axis of said shaft, a swiveling joint connecting the two shafts, an intermediate double barreled sleeve for housing the rollers, a spherical roller in each shaft concentric with the point of intersection of the shaft and said transverse axis, and a central bore in said sleeve parallel to said roller barrels for engaging both of said spherical rollers.

2. In a universal joint, the combination of a prismatic sleeve having three cylindrical bores parallel to each other with a T-shaped member comprising a shaft, a cross member at right angles thereto and three rollers rotatable on the said shaft, the arrangement being such that the outer two rollers are longitudinally slidable on their axes and serve to transmit the torque in different angular positions and the middle roller centers the T-shaped member relative to the sleeve.

3. A universal joint comprising a driving and a driven shaft, two rollers mounted on each shaft rotatable and longitudinally slidable upon a transverse axis at right angles to the axis of the shaft, a swiveling joint connecting the driving and driven shafts, a spherical member in each shaft concentric with the point of intersection of the shaft and said transverse roller axis, a central bore in the sleeve parallel to said roller barrels for housing said spherical members and two stops limiting the floating movement of said sleeve along its axis within a fixed distance.

4. A universal joint comprising a driving and a driven shaft, two rollers mounted on each shaft rotatable and longitudinally slidable upon a transverse axis at right angles to the axis of the shaft, a swiveling joint connecting the driving and driven shafts, a spherical roller in each shaft concentric with the point of intersection of the shaft and said transverse roller axis, a central bore in the sleeve parallel to said roller barrels for housing said spherical rollers and two stops limiting the floating movement of said sleeve along its axis within a fixed distance.

5. A universal joint comprising a sleeve member having three parallel cylindrical bores, a shaft member, one of said members being the driving and the other being the driven member, a cross shaft at right angles to said shaft, three rollers rotatable on said cross shaft, the two outer rollers being longitudinally slidable on the cross shaft axis to engage the outer of said bores and transmit the torque when said shaft member and sleeve member are in different angular positions and said middle roller engaging the central bore to insure that the center of said roller coincides with the axis of said sleeve.

NIKOLA TRBOJEVICH.